United States Patent [19]
Stevens

[11] Patent Number: 6,053,857
[45] Date of Patent: Apr. 25, 2000

[54] IMMOBILIZATION OF THALLIUM DURING ELECTRIC ARC FURNACE DUST TREATMENT

[75] Inventor: John Y. Stevens, Doylestown, Pa.

[73] Assignee: Conversion Systems, Inc., Horsham, Pa.

[21] Appl. No.: 09/080,011

[22] Filed: May 15, 1998

[51] Int. Cl.⁷ .................................................. A62D 3/00
[52] U.S. Cl. .......................... 588/257; 106/709; 106/736
[58] Field of Search .................................. 588/257, 256, 588/252; 106/709, 736

[56] References Cited

U.S. PATENT DOCUMENTS

| | | | |
|---|---|---|---|
| Re. 30,943 | 5/1982 | Nicholson | 106/85 |
| 1,899,473 | 2/1933 | Nichols . | |
| 2,373,244 | 4/1945 | Holz | 75/41 |
| 2,446,990 | 8/1948 | Schuetz | 106/39 |
| 2,793,109 | 5/1957 | Huebler | 75/3 |
| 2,808,325 | 10/1957 | Subervie | 75/29 |
| 2,880,101 | 3/1959 | Ulfstedt | 106/87 |
| 3,547,623 | 12/1970 | Larpenteur et al. | 75/25 |
| 3,565,648 | 2/1971 | Mori et al. | 106/89 |
| 3,782,985 | 1/1974 | Gebhardt | 106/97 |
| 3,834,916 | 9/1974 | Kesler | 106/99 |
| 3,953,222 | 4/1976 | Bainton | 106/97 |
| 4,209,335 | 6/1980 | Katayama et al. | 106/89 |
| 4,256,500 | 3/1981 | Turpin, Jr. | 106/88 |
| 4,615,809 | 10/1986 | King | 210/751 |
| 4,684,407 | 8/1987 | Umezawa et al. | 106/90 |
| 4,911,757 | 3/1990 | Lynn et al. | 106/85 |
| 5,245,122 | 9/1993 | Smith | 588/257 |
| 5,304,709 | 4/1994 | Babcock et al. | 588/257 |
| 5,431,825 | 7/1995 | Diel | 210/719 |
| 5,439,608 | 8/1995 | Kondrats | 252/88 |
| 5,470,375 | 11/1995 | Greenwalt | 75/505 |
| 5,540,751 | 7/1996 | Yamamoto et al. | 75/376 |
| 5,556,457 | 9/1996 | Terza et al. | 106/697 |
| 5,557,031 | 9/1996 | Al-Sugair et al. | 588/257 |
| 5,569,152 | 10/1996 | Smith | 588/256 |

FOREIGN PATENT DOCUMENTS 50-87964 7/1975 Japan .
53-117677 10/1978 Japan .

OTHER PUBLICATIONS

The Cement Association of Japan, Review of the Thirty–first General Meeting, Technical Session, Held in Tokyo, May 1977, *Semento Gijutsu Nempô*, 1977 Synopses.

Conner, J. R., "Chemical Fixation and Solidification of Hazardous Wastes," 1990, pp. 79, 335, 354, 374, 180, 182, 358, 170, and 165.

Peoria Disposal Company, "RCRA Part B Permit Application," vol. 8, Mar. 1997, Appendix G.

Berlow, J. R., Keegan, J., "Best Demonstrated Available Technology (BDAT) Background Document for K061," Aug. 1988, pp. 2–12 through 2–14; 3–16 through 3–18; 4–2 through 4–5; 4–22 through 4–25; and 6–1 through 6–10.

*Primary Examiner*—William Neuder
*Assistant Examiner*—Zakiya Walker
*Attorney, Agent, or Firm*—Ratner & Prestia

[57] ABSTRACT

A method and a mixture for chemically stabilizing electric arc furnace dust (EAFD) containing thallium by entrapping the metals inherent in EAFD within a cementitiously hardened product from the mixture. The method includes using the pozzolanic characteristics of EAFD by forming a mixture of EAFD with sufficient water, ferrous sulfate, and Portland cement, then permitting the mixture to react to form a product having a decreased concentration of thallium in its leachate. The method may also include permitting the mixture to form a cementitiously hardened product. The composition of the present invention is the mixture of EAFD, water, ferrous sulfate, and Portland cement. Even immediately after forming the mixture and before hardening, the composition has acceptable leachate characteristics. The hardened product also has acceptable leachate concentrations.

15 Claims, No Drawings

IMMOBILIZATION OF THALLIUM DURING ELECTRIC ARC FURNACE DUST TREATMENT

FIELD OF THE INVENTION

The present invention pertains to the stabilization of electric arc furnace dust (EAFD) containing thallium and, more specifically, to the immobilization of thallium during EAFD treatment.

BACKGROUND OF THE INVENTION

The electric arc furnace process is a common steel making practice in use today. In a typical electric arc furnace process, solid charge ingredients including raw scrap, limestone, burnt lime, iron ore and ferro-alloy additives are placed in a top-charge furnace unit.

A conventional furnace unit is equipped with (1) a roof lift and swing arrangement which permits the roof to swing aside when cold scrap is charged into the furnace, (2) a rocker and rail tilting type arrangement which permits the furnace to tilt forward for tapping and backward for slagging, (3) a system for additions through the furnace roof, and (4) evacuation systems for the removal of dust generated during the steel making cycle.

Electrodes are supported by electrode arms and clamps and project from overhead down through the furnace roof. An electric arc surging between the electrodes and through the furnace charge, typically comprising largely scrap metal, produces heat which melts the charge and refines the steel. The molten steel is tapped, typically at about 3000° F., into a ladle and cast into blooms or poured into ingot molds.

In such a process, particulate emissions are generated during (1) charging of scrap, (2) tapping of furnaces, (3) pneumatic injection of additives, (4) oxygen blowing, and (5) meltdown/refining periods. This particulate, which is individually and collectively referred to as electric arc furnace dust (hereinafter EAFD), is typically collected either as a dry waste in baghouses or wet, as sludge.

In its emitted form, EAFD readily leaches heavy metals when wet, producing heavy metals concentrations in leachate which exceed the limits as set forth by the United States Environmental Protection Agency (EPA). In fact, EAFD is designated hazardous by the EPA and carries the designation of "KO61" as a hazardous material because of the presence of relatively high amounts of leachable heavy metals, for example, lead, chromium, cadmium, and thallium. As a hazardous material, untreated EAFD can be disposed of only in landfills designated to accommodate hazardous materials. Such landfills are more costly than landfills designated to accommodate non-hazardous materials. In addition, the transportation and handling of hazardous materials are more expensive than the transportation and handling of non-hazardous materials.

The EPA has set forth certain tests to assess whether a particular process is deemed to transform EAFD into a product which may be placed in any landfill, either hazardous or non-hazardous. These tests are described in Appendix II of 40 C.F.R. § 261, which sets forth a two-stage testing procedure for making a determination as to whether a newly-presented procedure transforms EAFD into an acceptable product. The first stage of this two-stage procedure is known as the EPA's Toxicity Characteristic Leaching Procedure (TCLP), which involves exposing the material to be tested to an acetic acid solution for sixteen hours. The second stage is known as the Multiple Extraction Procedure (MEP), which involves exposing the solids filtered from the TCLP to nine sequential baths of acids, including nitric and sulfuric acids. This test has been deemed equivalent to exposure to 1,600 hours of acid rainfall.

After completion of the MEP, the leachate is measured for fourteen metals. If the concentrations in the leachate of thirteen of these metals are less than the concentration limits specified by the EPA as its Land Disposal Restriction (LDR) limits, then the EAFD treated by the tested process may be disposed of in a landfill accommodating hazardous wastes. More desirably, if the concentrations in the leachate of all fourteen metals are less than the concentration limits specified below (i.e., the Generic Delisting Limits (GDL)), then the material is deemed non-hazardous and may be disposed of in any landfill:

TABLE 1

| | |
|---|---|
| Antimony | 0.06 mg/l |
| Arsenic | 0.50 mg/l |
| Barium | 7.6 mg/l |
| Beryllium | 0.010 mg/l |
| Cadmium | 0.050 mg/l |
| Chromium | 0.33 mg/l |
| Lead | 0.15 mg/l |
| Mercury | 0.009 mg/l |
| Nickel | 1 mg/l |
| Selenium | 0.16 mg/l |
| Silver | 0.30 mg/l |
| Thallium | 0.020 mg/l |
| Vanadium | 2 mg/l |
| Zinc | 70 mg/l |

The current state of the art for treatment and disposal of EAFD is either high temperature processing or chemical stabilization/fixation. For technical and economic reasons, the chemical stabilization/fixation treatment is growing rapidly in use and was performed on over one-third of the approximately 750,000 tons of EAFD generated in 1997 in the United States.

Several methods of chemically stabilizing EAFD have been disclosed. For example, U.S. Pat. Nos. 4,840,671 and 4,911,757, entitled PROCESS FOR CHEMICAL STABILIZATION OF HEAVY METAL BEARING DUSTS AND SLUDGES and issued to Lynn et al., disclose methods and mixtures for stabilizing EAFD and similar dusts. The methods disclosed in these two references include mixing EAFD with fly ash, lime, and water, among other ingredients. This method relies primarily on the pozzolanic characteristics of fly ash to physically entrap the hazardous constituents of EAFD within a cementitiously hardened product.

U.S. Pat. No. 5,245,122, entitled METHOD AND MIXTURE FOR TREATING ELECTRIC ARC FURNACE DUST, discloses a method for chemically stabilizing a hazardous waste composition containing EAFD by utilizing the pozzolanic characteristics of EAFD. This method involves forming a mixture of EAFD with water and lime and, optionally, ferrous sulfate. The freshly blended product has acceptable leachate concentrations. The method disclosed in the '122 patent minimizes the concentration of certain heavy metals in the leachate from the freshly blended product. U.S. Pat. No. 5,569,152, entitled BUFFERING OF CEMENTITIOUS HAZARDOUS WASTE COMPOSITIONS CONTAINING ELECTRIC ARC FURNACE DUST, specifies the use of dolomitic lime as a buffering agent for a cementitious hazardous waste composition including EAFD.

The composition of EAFD is dependent on the type of metal used as scrap added to the electric arc furnace. In recent years, there has been a trend of using scrap metals having an increased thallium content as additives to electric arc furnaces. Accordingly, the EAFD derived from electric arc furnaces has included more and more thallium. There is a need for a stabilization process of EAFD which immobilizes, or limits the leachability of, thallium.

SUMMARY OF THE INVENTION

The present invention provides a method and composition for treating EAFD containing thallium to reduce the concentration of hazardous constituents, including thallium, in leachate from the EAFD. The composition is the mixture of EAFD containing thallium, sufficient water to react with the EAFD, ferrous sulfate, and Portland cement. The method involves forming the mixture then permitting the mixture to react to form a product having a decreased concentration of thallium in a leachate of the product. The method may also include permitting the mixture to react further to form a cementitiously hardened product.

It is to be understood that both the foregoing general description and the following detailed description are exemplary, but are not restrictive, of the invention.

DETAILED DESCRIPTION OF THE INVENTION

The present invention is directed to a method and composition for treating EAFD containing thallium to reduce the concentration of hazardous constituents, including thallium, in leachate from the EAFD. The composition is the mixture of EAFD containing thallium, sufficient water to react with the EAFD, ferrous sulfate, and Portland cement. The method involves forming the mixture, then permitting the mixture to react to form a product having a decreased concentration of thallium in a leachate of the product. The method may also include permitting the mixture to react further to form a cementitiously hardened product.

As discussed above, EAFD is defined as the solid matter emitted from an electric arc furnace. As previously stated, these emissions occur during various phases of the operation of an electric arc furnace including: (1) charging of scrap; (2) tapping of furnaces; (3) pneumatic injection of additives; (4) oxygen blowing; and (5) meltdown/refining periods.

EAFD is the dust removed during any one of the above operations or a collection from any combination thereof. EAFD may be collected as a dry waste or wet, as a sludge. In its emitted form, EAFD readily leaches when wet, producing leachate concentrations which exceed the limits as set forth by the EPA. When untreated EAFD is subjected to the EPA's Toxicity Characteristic Leaching Procedure (TCLP) described in Appendix II in 40 C.F.R. § 261, leachate concentrations for lead, cadmium, chromium, and thallium generally exceed both the EPA's GDL and LDR limits.

In determining the concentration of EAFD in the wet mass, it is desirable to have as much EAFD present in the mass without resulting in a leachate which exceeds the EPA's LDR, or more preferably GDL, limits. By treating as much EAFD as possible, the total volume of waste is minimized. Generally, the concentration of EAFD in the wet mass to be stabilized may be within the range of about 50 to about 81 %. (Unless otherwise indicated, all percentages herein will be given as a wet weight basis, i.e. the weight of the constituent divided by the total weight of the mixture, including the weight of any water.) Preferably, the concentration of EAFD is within about 63 to about 76%.

Preferably, the EAFD used in the present invention has minimal variations in concentrations of the EAFD constituents from various samples of the EAFD. Preferably, the EAFD is selected from a single source and/or is well-mixed.

The composition also includes water in an amount sufficient to react with the EAFD. The amount of water could be easily determined by one skilled in the art by balancing the following factors: (1) having enough water for the chemical reactions to occur; (2) permitting some level of compaction to occur; and (3) controlling the dust from escaping the reaction area. For example, an EAFD which has very fine particles might require more water to control the dust. Generally, the sludge only need include about 15 to about 28% water (wet weight basis, i.e. weight of water divided by the total wet weight of the mixture). The preferred water content is about 18 to about 25%.

The mixture of the present invention also includes ferrous sulfate. Ferrous sulfate may be added as a crystal or as a solution. It is believed that ferrous sulfate serves to reduce hexavalent chromium to trivalent chromium. Trivalent chromium is less soluble than hexavalent chromium and is thus less likely to leach from the cementitiously hardened product. Also, ferrous sulfate assists in the formation of lead sulfate ($PbSO_4$), a less soluble form of lead. The desired amount of ferrous sulfate could be determined easily by one skilled in the art by assessing the effect of ferrous sulfate on chromium and lead concentration of the leachate from the TCLP. In general, ferrous sulfate may be added in a range of from about 1 to about 10%, preferably about 3 to about 6%.

The fourth additive according to the present invention is Portland cement. As defined by ASTM Designation C150-97 (standard specification for Portland cement), the term "Portland cement" means a hydraulic cement produced by pulverizing clinker consisting essentially of hydraulic calcium silicates, usually containing one or more of the forms of calcium sulfate as an inter-ground addition. Any type of Portland cement should serve to minimize thallium concentration in a leachate. Preferably, Portland cement types I and II are used for cost savings. The concentration of Portland cement can be determined by monitoring the effect of Portland cement on thallium concentration in the leachate from the TCLP. In general, the concentration of Portland cement may range from about 3% to about 20%, and preferably from about 3% to about 12%.

An optional additive to the composition is lime. Although any type of lime may be used, dolomitic lime is preferable for its ability to buffer the composition as described in U.S. Pat. No. 5,569,152, incorporated herein by reference. The amount of lime added is dependent on the amount of lime inherent in the EAFD: An EAFD with a lot of inherent lime would need little or no lime added, while an EAFD with very little inherent lime might require a lot of lime added. In general, the amount of lime added might range from 0 to about 8%, and preferably from about 0.5 to about 3%, to achieve a total available lime concentration of about 5 to about 7%.

Yet another optional additive is fly ash. Fly ash is the fine ash produced by the combustion of powdered coal. It does not appear that fly ash plays a significant role in this invention and, if added, is added in a range of about 1% to about 6%.

The order of addition of the constituents is not important. For example, the four constituents (i.e., EAFD, water, Portland cement, and ferrous sulfate) may be added together simultaneously or may be premixed in any combination. It is not believed that any intermediates between two or three of the constituents are formed which are critical to the operation of the composition and method of the present invention. Preferably, the order of addition is to blend the dry ingredients (i.e., EAFD, Portland cement, and ferrous sulfate) well, then add water, to ease the mixing effort. (It should be noted that although ferrous sulfate is referred to as "dry," it is typically added in its hydrated form.) In addition, the manner of nixing the materials is not important and any conventional means can be used to attain a well-mixed composition.

The process steps of the present invention, namely forming the mixture and permitting it to undergo some reaction, can be carried out in a known manner. The only qualification to the first step is that the constituents be well mixed. The step of permitting the mixture to react to form a product having a decreased concentration of thallium in a leachate can be accomplished by simply letting the mixture stand at room temperature or at a slightly elevated temperature. The reaction occurs almost immediately. Thus, shortly after the mixture is formed, the concentration of thallium in a leachate is "decreased" in that the concentration of thallium in a leachate of the mixture is less than the concentration of a leachate of pure EAFD. The "leachate" can be that formed by any of the procedures discussed herein, which involve washing the mixture with water or an acidic aqueous solution.

Even immediately after mixing, the mixture of the present invention typically has leachate characteristics below the EPA's LDR limits, after undergoing the EPA's TCLP. Preferably, the mixture of the present invention has leachate characteristics below the EPA's GDL limits, after undergoing the EPA's TCLP.

Preferably, after mixing the constituents, the mixture is permitted to react (or cure) to form a cementitiously hardened product. The reaction may be accomplished, for example, by permitting the mixture to react for seven days at 100° F. More commonly, field curing time, equivalent to seven days at 100° F., is used. A typical field curing time is thirty days at 73° F. The experiments reported in the examples below were not permitted to react prior to being subjected to the leaching procedures.

The product formed from a mixture of the present invention (either before or after hardening) minimizes the leaching of undesirable heavy metals, including thallium. Furthermore, the mixture, during curing, does not undergo a weight and volume increase as large as some known stabilization methods and mixtures. Preferably, the mixture and method of the present invention forms a product which has leachate concentration of each metal below that set forth in Table 1 above.

The following examples are included to more clearly demonstrate the overall nature of the invention. These examples are exemplary, not restrictive, of the invention.

EXAMPLES

Examples 1–3 each report a final TCLP pH value and content of heavy metals of various compositions. In these examples, various samples of EAFD were mixed with combinations of pressure dihydrated dolomitic lime (referred to as "S-lime" below), type II Portland cement, fly ash, ferrous sulfate, and water. The mixtures were subjected to the EPA's Toxicity Characteristic Leaching Procedure. As mentioned above, this procedure involves agitating the waste composition, immediately after the compositions are interblended, for 16 hours while exposing the composition to an acetic acid solution. The leachates were then analyzed for pH and metals content by standard chemical qualitative and quantitative analysis procedures.

Example 1

Fourteen EAFD samples from an electric arc furnace in Arkansas were mixed with various combinations of S-lime, cement, fly ash, ferrous sulfate, and water in the portions shown in Table 2.

TABLE 2

|  | Mix 1 | Mix 2 | Mix 3 | Mix 4 | Mix 5 | Mix 6 | Mix 7 | Mix 8 |
|---|---|---|---|---|---|---|---|---|
| EAFD % | 72.0 | 68.0 | 64.0 | 75.0 | 60.0 | 55.0 | 71.0 | 72.0 |
| S-Lime % | 5.0 | 6.0 | 7.0 | 4.0 | 8.0 | 10.0 | | |
| Cement % | | | | | | | 6.0 | 6.0 |
| Fly Ash % | | | | | | | | |
| $FeSO_4$ % | 3.0 | 6.0 | 9.0 | 1.0 | 12.0 | 15.0 | 3.0 | 2.0 |
| $H_2O$ % | 20.0 | 20.0 | 20.0 | 20.0 | 20.0 | 20.0 | 20.0 | 20.0 |
| TCLP pH | 10.00 | 9.80 | 9.75 | 10.10 | 9.50 | 9.60 | 10.25 | 10.40 |
| Sb | <0.010 | <0.010 | <0.010 | <0.010 | <0.010 | <0.010 | <0.010 | <0.010 |

TABLE 2-continued

|    | | | | | | | | |
|----|------|------|------|------|------|------|------|------|
| As | <0.050 | <0.050 | <0.050 | <0.050 | <0.050 | <0.050 | <0.050 | <0.050 |
| Ba | <0.50 | <0.50 | <0.50 | <0.50 | <0.50 | <0.50 | <0.50 | <0.50 |
| Be | <0.001 | <0.001 | <0.001 | <0.001 | <0.001 | <0.001 | <0.001 | <0.001 |
| Cd | <0.005 | 0.005 | 0.007 | <0.005 | 0.010 | 0.011 | 0.007 | 0.008 |
| Cr | <0.050 | <0.050 | <0.050 | <0.050 | <0.050 | <0.050 | <0.050 | <0.050 |
| Pb | <0.050 | <0.050 | <0.050 | <0.050 | <0.050 | <0.050 | <0.050 | <0.050 |
| Hg | <0.002 | <0.002 | <0.002 | <0.002 | <0.002 | <0.002 | <0.002 | <0.002 |
| Ni | <0.050 | <0.050 | <0.050 | <0.050 | <0.050 | <0.050 | <0.050 | <0.050 |
| Se | <0.050 | <0.050 | <0.050 | <0.050 | <0.050 | <0.050 | <0.050 | <0.050 |
| Ag | <0.050 | <0.050 | <0.050 | <0.050 | <0.050 | <0.050 | <0.050 | <0.050 |
| Tl | 0.029 | 0.029 | 0.021 | 0.042 | 0.019 | 0.024 | 0.009 | 0.006 |
| V  | <0.050 | <0.050 | <0.050 | <0.050 | <0.050 | <0.050 | <0.050 | 0.055 |
| Zn | <0.050 | <0.050 | <0.050 | <0.050 | <0.050 | <0.050 | <0.050 | <0.050 |

|    | Mix 9 | Mix 10 | Mix 11 | Mix 12 | Mix 13 | Mix 14 | Mix 15 | GDL |
|----|------|------|------|------|------|------|------|------|
| EAFD % | 68.0 | 72.0 | 73.0 | 74.0 | 70.5 | 69.0 | 66.0 | |
| S-Lime % | | | | | 0.5 | 5.0 | 5.0 | |
| Cement % | 7.0 | 5.0 | 5.0 | 5.0 | 5.0 | | | |
| Fly Ash % | | | | | | 3.0 | 6.0 | |
| $FeSO_4$ % | 5.0 | 3.0 | 2.0 | 1.0 | 4.0 | 3.0 | 3.0 | |
| $H_2O$ % | 20.0 | 20.0 | 20.0 | 20.0 | 20.0 | 20.0 | 20.0 | |
| TCLP pH | 10.20 | 9.90 | 9.75 | 10.35 | 10.00 | 9.90 | 9.80 | |
| Sb | <0.010 | <0.010 | <0.010 | <0.010 | <0.010 | <0.010 | <0.010 | 0.06 |
| As | <0.050 | <0.050 | <0.050 | <0.050 | <0.050 | <0.050 | <0.050 | 0.50 |
| Ba | <0.50 | <0.50 | <0.50 | <0.50 | <0.50 | <0.50 | <0.50 | 7.6 |
| Be | <0.001 | <0.001 | <0.001 | <0.001 | <0.001 | <0.001 | <0.001 | 0.010 |
| Cd | 0.008 | <0.005 | 0.007 | <0.005 | <0.005 | <0.005 | <0.005 | 0.050 |
| Cr | <0.050 | <0.050 | <0.050 | 0.067 | <0.050 | <0.050 | <0.050 | 0.33 |
| Pb | <0.050 | <0.050 | <0.050 | <0.050 | <0.050 | <0.050 | <0.050 | 0.15 |
| Hg | <0.002 | <0.002 | <0.002 | <0.002 | <0.002 | <0.002 | <0.002 | 0.009 |
| Ni | <0.050 | <0.050 | <0.050 | <0.050 | <0.050 | <0.050 | <0.050 | 1 |
| Se | <0.050 | <0.050 | <0.050 | <0.050 | (0.050 | <0.050 | <0.050 | 0.16 |
| Ag | <0.050 | <0.050 | <0.050 | <0.050 | <0.050 | <0.050 | <0.050 | 0.30 |
| Tl | 0.002 | 0.012 | 0.010 | 0.019 | 0.017 | 0.030 | 0.032 | 0.020 |
| V  | <0.050 | <0.050 | <0.050 | <0.050 | <0.050 | <0.050 | <0.050 | 2 |
| Zn | <0.050 | <0.050 | <0.050 | <0.050 | <0.050 | <0.050 | <0.050 | 70 |

TCLP results as mg/L.

The constituents were well-mixed in a laboratory at room temperature. No cure time was provided after mixing and before subjecting the mixtures to the TCLP.

Both the concentrations of the additives to the compositions and the results of the chemical analysis for metals content are shown in Table 2, with the percentages given in wet weight percent and TCLP results shown as mg/l. As shown in Table 2, all of the mixtures contain 20% water. Mixtures 7–13 are representative of the present invention, while mixtures 1–6 and 14 and 15 are shown for comparative purposes.

As can be seen from viewing the thallium content in the leachate, all six of the compositions of the present invention had a thallium content in the leachate of less than the GDL of 0.020 mg/l. These concentrations of thallium ranged from a low of 0.002 mg/l (mix 9) to a high of 0.019 mg/l (mix 12). On the other hand, only one of the eight comparative examples had a thallium concentration in the leachate less than the limit of 0.020 mg/l (i.e., mix 5 at 0.019 mg/l). In fact, these thallium concentrations ranged from the low of mix 5 to a high of 0.042 mg/l (mix 4). Thus, the compositions of the present invention, including Portland cement, significantly reduce the thallium content in a leachate, without adversely affecting the contents of the other heavy metals in the leachate.

Example 2

Nine EAFD samples from the same source of Example 1 were mixed with various combinations of S-lime, Portland cement, ferrous sulfate, and water in the portions shown in Table 3.

TABLE 3

NUCOR-PLYMOUTH SUPER DETOX COMPOSITIONS versus THALLIUM LEACHING IN TCLP TESTS

|  | Mix 31 | Mix 32 | Mix 33 | Mix 34 | Mix 35 | Mix 36 | Mix 37 | Mix 38 | Mix 39 |
|---|---|---|---|---|---|---|---|---|---|
| EAFD (%) | 100 | 69 | 70 | 65 | 66 | 65 | 64 | 60 | 56 |
| LIME (%) | | 8 | 9 | 9 | | | | | |
| CEMENT (%) | | | | | 11 | 12 | 13 | 14 | 15 |
| $FeSO_4$ (%) | | 3 | 3 | 6 | 3 | 3 | 3 | 6 | 9 |
| WATER (%) | | 20 | 18 | 20 | 20 | 20 | 20 | 20 | 20 |

TABLE 3-continued

NUCOR-PLYMOUTH SUPER DETOX COMPOSITIONS versus THALLIUM LEACHING IN TCLP TESTS

|  | Mix 31 | Mix 32 | Mix 33 | Mix 34 | Mix 35 | Mix 36 | Mix 37 | Mix 38 | Mix 39 |
|---|---|---|---|---|---|---|---|---|---|
| post-TCLP THALLIUM (mg/L) | 0.061 | 0.035 | 0.042 | 0.029 | 0.008 | <0.002 | <0.002 | <0.002 | <0.002 |

The same procedures used in connection with Example 1 were used in the mixtures of Example 2.

As can be seen from Table 3, mixes 35–39 are representative of the present invention, mixes 32–34 are for comparative purposes, and mix 31 is merely of pure EAFD. With no additives, the post-TCLP thallium content is 0.061 mg/l thallium, as shown by mix 31. All three comparative mixes, namely mixes 32–34, resulted in post-TCLP thallium contents of above the limit of 0.020 mg/l. On the other hand, all five mixes representative of the present invention resulted in post-TCLP thallium contents of well below this limit, with four of the five having contents less than 0.002 mg/l thallium.

Example 3

Ten EAFD samples from an electric arc furnace in Alabama were mixed with various combinations of S-lime, Portland cement, ferrous sulfate, and water in the portions shown on Table 4.

were only slightly above. In addition, the ferrous sulfate content of mixtures 49 and 50 was only 2%, while it was 3% in the preferred embodiments of mixtures 47 and 48. Two of the six samples of comparative examples 41–46 had leachate concentrations less than the limit of 0.020 mg/l. None of the samples were as low as mixture 47, however, and the average thallium content of these comparative mixtures was slightly above 0.020.

Although illustrated and described herein with reference to certain specific embodiments and examples, the present invention is nevertheless not intended to be limited to the details shown. Rather, the claims should be read to include various modifications within the scope and range of equivalents of the claims, which are nevertheless within the true spirit of the invention.

What is claimed is:

1. A composition for treating electric arc furnace dust containing a form of thallium which is inherent in said electric arc furnace dust to reduce the concentration of hazardous constituents in a leachate from said electric arc

TABLE 4

|  | Mix 41 | Mix 42 | Mix 43 | Mix 44 | Mix 45 | Mix 46 | Mix 47 | Mix 48 | Mix 49 | Mix 50 | GDL |
|---|---|---|---|---|---|---|---|---|---|---|---|
| EAFD % | 68.0 | 67.0 | 69.0 | 71.0 | 63.0 | 59.0 | 67.0 | 66.0 | 68.0 | 67.0 | |
| S-Lime % | 9.0 | 10.0 | 9.0 | 8.0 | 11.0 | 12.0 | | | | | |
| Cement % | | | | | | | 10.0 | 11.0 | 10.0 | 11.0 | |
| FeSO4 % | 3.0 | 3.0 | 2.0 | 1.0 | 6.0 | 9.0 | 3.0 | 3.0 | 2.0 | 2.0 | |
| H2O % | 20.0 | 20.0 | 20.0 | 20.0 | 20.0 | 20.0 | 20.0 | 20.0 | 20.0 | 20.0 | |
| TCLP pH | 9.60 | 10.05 | 10.00 | 9.75 | 9.80 | 9.70 | 9.60 | 9.75 | 9.70 | 9.75 | |
| Sb | <0.010 | <0.010 | 0.013 | 0.013 | <0.010 | 0.013 | <0.010 | <0.010 | <0.010 | <0.010 | 0.06 |
| As | <0.050 | <0.050 | <0.050 | <0.050 | <0.050 | <0.050 | <0.050 | <0.050 | <0.050 | <0.050 | 0.50 |
| Ba | <0.50 | <0.50 | <0.50 | <0.50 | <0.50 | <0.50 | <0.50 | <0.50 | <0.50 | <0.50 | 7.6 |
| Be | <0.001 | <0.001 | <0.001 | <0.001 | <0.001 | <0.001 | 0.002 | 0.002 | 0.001 | 0.001 | 0.010 |
| Cd | <0.005 | <0.005 | <0.005 | <0.005 | <0.005 | <0.005 | 0.006 | 0.005 | 0.006 | <0.005 | 0.050 |
| Cr | <0.050 | <0.050 | <0.050 | <0.050 | <0.050 | <0.050 | <0.050 | <0.050 | <0.050 | <0.050 | 0.33 |
| Pb | <0.050 | <0.050 | <0.050 | <0.050 | <0.050 | <0.050 | <0.050 | <0.050 | <0.050 | <0.050 | 0.15 |
| Hg | <0.002 | <0.002 | <0.002 | <0.002 | <0.002 | <0.002 | <0.002 | <0.002 | <0.002 | <0.002 | 0.009 |
| Ni | <0.050 | <0.050 | <0.050 | <0.050 | <0.050 | <0.050 | <0.050 | <0.050 | <0.050 | <0.050 | 1 |
| Se | <0.050 | <0.050 | <0.050 | <0.050 | <0.050 | <0.050 | <0.050 | <0.050 | <0.050 | <0.050 | 0.16 |
| Ag | <0.050 | <0.050 | <0.050 | <0.050 | <0.050 | <0.050 | <0.050 | <0.050 | <0.050 | <0.050 | 0.30 |
| Tl | 0.024 | 0.016 | 0.021 | 0.022 | 0.017 | 0.021 | 0.012 | 0.016 | 0.021 | 0.023 | 0.020 |
| V | <0.050 | <0.050 | <0.050 | <0.050 | <0.050 | <0.050 | 0.129 | 0.131 | 0.092 | 0.151 | 2 |
| Zn | <0.050 | <0.050 | <0.050 | <0.050 | <0.050 | <0.050 | <0.050 | <0.050 | <0.050 | <0.050 | 70 |

TCLP results as mg/L.

The same procedures as used in connection with Example 1 were used on the mixtures of Example 3.

As will be seen from Table 4, mixtures 41–46 are comparative examples, while mixtures 47–50 are representative of the present invention. Turning to mixtures 47–50, two of the four mixtures had thallium content in the leachate of less than the limit of 0.020 mg/l (namely mixtures 47 and 48). Although mixtures 49 and 50 were above the limit, they furnace dust, said composition comprising a mixture of sufficient water to react with said electric arc furnace dust, ferrous sulfate, and Portland cement, wherein a reaction product is formed between said Portland cement and said form of thallium.

2. The composition of claim 1, wherein:
   the concentration of said electric arc furnace dust is about 50 to about 81 weight percent;

the concentration of said water is about 15 to about 28 weight percent;

the concentration of said ferrous sulfate is about 1 to about 10 weight percent; and the concentration of said Portland cement is about 3 to about 20 weight percent.

3. The composition of claim 2, wherein:

the concentration of said electric arc furnace dust is about 63 to about 76 weight percent;

the concentration of said water is about 18 to about 25 weight percent;

the concentration of said ferrous sulfate is about 3 to about 6 weight percent; and the concentration of said Portland cement is about 3 to about 12 weight percent.

4. The composition of claim 1, wherein said mixture produces a leachate having concentrations of no more than the limits shown below:

| | |
|---|---|
| Antimony | 0.06 mg/l; |
| Arsenic | 0.50 mg/l; |
| Barium | 7.6 mg/l; |
| Beryllium | 0.010 mg/l; |
| Cadmium | 0.050 mg/l; |
| Chromium | 0.33 mg/l; |
| Lead | 0.15 mg/l; |
| Mercury | 0.009 mg/l; |
| Nickel | 1 mg/l; |
| Selenium | 0.16 mg/l; |
| Silver | 0.30 mg/l; |
| Thallium | 0.020 mg/l; |
| Vanadium | 2 mg/l; and |
| Zinc | 70 mg/l. |

5. The composition of claim 1 further comprising added lime.

6. The composition of claim 1 further comprising fly ash.

7. A method for treating electric arc furnace dust containing thallium to reduce the concentration of hazardous constituents in leachate from said electric arc furnace dust, said method comprising the steps of:

forming a mixture of said electric arc furnace dust containing thallium, sufficient water to react with said electric arc furnace dust, ferrous sulfate, and Portland cement; and then permitting said mixture to react to form a product having a decreased concentration of thallium in a leachate.

8. The method of claim 7, wherein:

the concentration of said electric arc furnace dust is about 50 to about 81 weight percent;

the concentration of said water is about 15 to about 28 weight percent;

the concentration of said ferrous sulfate is about 1 to about 10 weight percent; and the concentration of said Portland cement is about 3 to about 20 weight percent.

9. The method of claim 8, wherein:

the concentration of said electric arc furnace dust is about 63 to about 76 weight percent;

the concentration of said water is about 18 to about 25 weight percent;

the concentration of said ferrous sulfate is about 3 to about 6 weight percent; and the concentration of said Portland cement is about 3 to about 12 weight percent.

10. The method of claim 7, wherein said mixture produces a leachate, said leachate having concentrations of no more than the limits shown below:

| | |
|---|---|
| Antimony | 0.06 mg/l; |
| Arsenic | 0.50 mg/l; |
| Barium | 7.6 mg/l; |
| Beryllium | 0.010 mg/l; |
| Cadmium | 0.050 mg/l; |
| Chromium | 0.33 mg/l; |
| Lead | 0.15 mg/l; |
| Mercury | 0.009 mg/l; |
| Nickel | 1 mg/l; |
| Selenium | 0.16 mg/l; |
| Silver | 0.30 mg/l; |
| Thallium | 0.020 mg/l; |
| Vanadium | 2 mg/l; and |
| Zinc | 70 mg/l. |

11. The method of claim 7, further comprising permitting said mixture to form a cementitiously hardened product.

12. The method of claim 7, wherein said composition further comprises added lime.

13. The method of claim 7, wherein said composition further comprises fly ash.

14. A method for treating electric arc furnace dust containing thallium to reduce the concentration of hazardous constituents in leachate from said electric arc furnace dust, said method comprising the steps of:

forming a homogeneous mixture of dry ingredients comprising electric arc furnace dust, Portland cement, and ferrous sulfate; and then adding water to said homogenous mixture to form a product having a decreased concentration of thallium in a leachate.

15. The method of claim 14, wherein said ferrous sulfate comprises hydrated ferrous sulfate.

* * * * *